United States Patent [19]

Ralston et al.

[11] 4,050,522
[45] Sept. 27, 1977

[54] MULTI-SECTION HARROW ASSEMBLY

[75] Inventors: Harold A. Ralston, Racine; Alton B. Christensen, Kenosha, both of Wis.

[73] Assignee: J. I. Case Company, Racine, Wis.

[21] Appl. No.: 671,626

[22] Filed: Mar. 29, 1976

[51] Int. Cl.² .................. A01B 15/14; A01B 24/04
[52] U.S. Cl. .................. 172/311; 172/456; 280/411 R
[58] Field of Search .................. 172/311, 456; 280/411 R, 411 A, 412

[56] References Cited

U.S. PATENT DOCUMENTS

| | | | |
|---|---|---|---|
| 3,033,296 | 5/1962 | Kaufman | 172/311 X |
| 3,460,631 | 8/1969 | Friesen | 172/311 |
| 3,783,951 | 1/1974 | Gugin | 172/311 |

*Primary Examiner*—Richard J. Johnson
*Attorney, Agent, or Firm*—Dressler, Goldsmith, Clement, Gordon & Shore, Ltd.

[57] ABSTRACT

A harrow assembly having a main frame section and two wing frame sections articulated on generally fore and aft axes on opposite ends of the main frame section is disclosed herein. Each frame section has a rockshaft rotatable thereon and the rockshafts are in axial alignment when the sections are in end-to-end relation with an interconnection between adjacent ends of the respective rockshafts. The interconnection includes a pair of arms that have contacting surfaces defined thereon and the contact point between the surfaces is generally in alignment with the hinge axis between the respective sections when the assembly is in a normal earthworking position.

8 Claims, 5 Drawing Figures

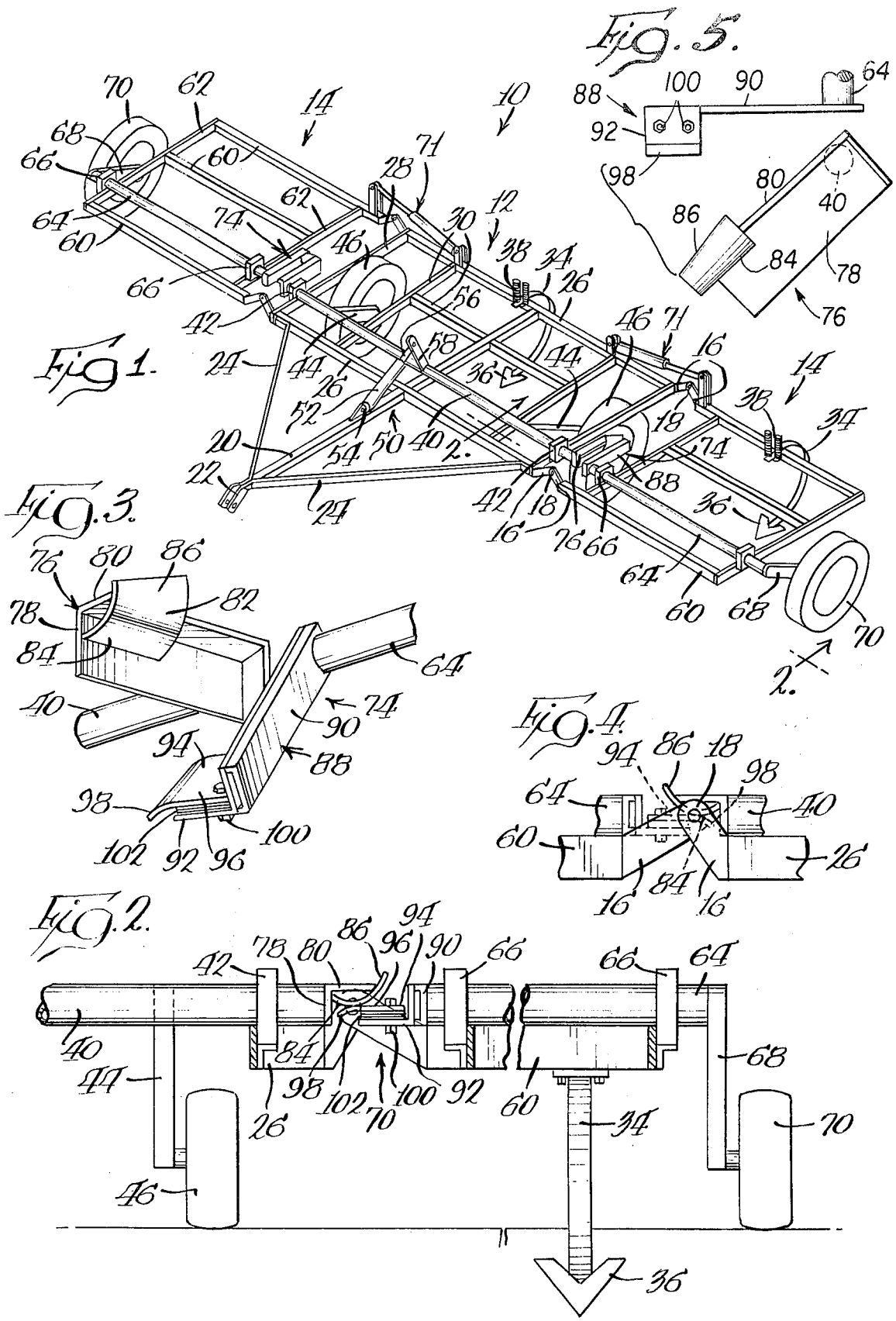

MULTI-SECTION HARROW ASSEMBLY

BACKGROUND OF THE INVENTION

The present invention relates generally to earthworking implements and more particularly to harrow assemblies of the type that have a plurality of articulated sections.

In recent years, many trailing type earthworking implements have been developed in which the implement frame is formed in at least three sections with the outer sections pivotally connected to the center or main section through hinge axes that extend generally fore and aft of the direction of travel of the implement. This allows the operator to pivot the outer end sections to a generally vertical position when the implement must be transported along roadways or other restricted areas and the transverse dimension of the implement in a working condition is about three times the transverse dimension of the implement in the transport condition.

One type of implement in which the articulated sections are utilized is a harrow assembly which has a center main frame section and a pair of outer end or wing sections articulated about fore and aft hinge axes on outer ends of the main frame section. One type of multi-section harrow assembly that has found a considerable degree of commercial acceptance incorporates a main shaft or rockshaft that is rotatably supported on the main frame and has a pair of wheels secured to the outer ends of arms that extend from the main shaft. These wheels support the main frame above the ground. Each wing section also has a rockshaft or wing shaft rotatably supported thereon with a single ground engaging wheel on the outer end of the arm fixed to the outer end of the wing shaft. The three shafts are in axial alignment with each other when the frame sections are in end-to-end relation. The respective rockshafts are rotated with respect to the frame to thereby raise and/or lower the wheels with respect to the frame sections to move the implement frame between raised and earthworking positions.

In order to simplify the mechanism for raising and lowering the implement, it has been customary to provide a single drive means between the main frame and the rockshaft for rotation of the main rockshaft and to provide some kind of interconnection means between the main rockshaft and the wing rockshafts so that rotary motion of the main shaft is automatically transmitted to the wing rockshafts.

Various types of proposals have been suggested for providing such interconnection between the main shaft and the wing shafts which will automatically be disengaged when the wing sections are pivoted to a transport position.

While these types of interconnection means have been proven satisfactory for use in field operations, one of the main problems encountered with the interconnection means between the various frame sections is the maintenance cost. Because of the arrangement of the various parts for the interconnecting means in prior art assemblies, considerable wear is encountered in the interconnection means during normal operation which requires frequent repair and/or replacement of parts.

SUMMARY OF THE INVENTION

According to the present invention, there is provided an improved interconnection between two shafts that are respectively rotatably supported on frame sections of an implement that are hingedly connected to each other for pivotal movement about a generally fore and aft pivot axis. The interconnection means is designed to minimize the amount of relative movement between the interconnected parts during the normal operation of the implement in an earthworking position.

More specifically, the interconnection means consists of a first member that is connected to an outer end of the main shaft rotatably supported on the main frame assembly for rotation about a generally horizontal axis extending transversely of the fore and aft direction of travel of the implement. The first arm extends rearwardly from the main shaft and has a downwardly directed generally arcuate surface defined thereon while the wing shaft has a second arm secured thereto and extending rearwardly therefrom with the second arm having an upwardly directed surface adapted to engage the arcuate surface. The arcuate surface on the main shaft is positioned so as to have its lowermost edge generally aligned with the hinge axis between the two sections and the respective arms extend generally horizontally when the assembly is in a normal earthworking position. This substantially reduces the amount of relative movement between the two surfaces which may be caused by having the implement traveling over uneven ground or terrain.

BRIEF DESCRIPTION OF THE SEVERAL VIEWS OF THE DRAWINGS

FIG. 1 is a perspective view of a multi-section implement with the sections shown in end-to-end relation;

FIG. 2 is a view as taken generally along line 2—2 of FIG. 1 showing the interconnection means between two articulated sections;

FIG. 3 is an enlarged fragmentary perspective view of the interconnection means with the members spaced from each other for clarity purposes;

FIG. 4 is a fragmentary plan view of the interconnection between two sections as viewed from the front of the implement; and FIG. 5 is an end view of the interconnection means, when the wing section is in a transport position.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses an earthworking implement generally designated by the reference numeral 10. Earthworking implement 10, illustrated in FIG. 1, consists of a harrow assembly that includes a center main frame section 12 and first and second outer end sections 14 which are respectively pivoted on the outer ends of the main frame section for articulated movement about fore and aft pivot axes. As illustrated in FIG. 1, each pivot axis or hinge axis is defined by a pair of lugs 16 that respectively extend from the fore and aft ends of the main section and the associated outer end or wing section and are pivotally interconnected by pins 18.

The main frame section 12 has a drawbar 20 secured thereto with a yoke 22 on the forward end of the drawbar, which is rigidified by a pair of angularly disposed stabilizers 24 that extend from the forward end of drawbar 20 to the outer ends of main frame section 12. Main frame section 12 consists of forward and rearward transversely extending frame elements 26 that are interconnected at opposite ends by frame elements 28. A plurality of further support elements 30 are located within the confines of peripheral frame elements 26 and 28. The transversely extending frame elements 26 and 30 each have a plurality of earthworking members supported thereon, such as tooth harrows 34 (only one being shown) having pointed ground engaging ends 36 and securing means 38 at the upper end.

The main frame section or center section 12 also supports a main shaft or rockshaft 40 that is journaled for rotation at opposite ends in bearing members 42 on the forward end of the frame section about an axis that extends transversely of the fore and aft path of travel of the assembly 10. Rockshaft 40 has a pair of arms 44 extending therefrom with a pair of wheels 46 rotatably supported on the outer ends of arms 44. A fluid ram 50 is interposed between frame 12 and rockshaft 40 for rotating rockshaft 40 on the frame. Fluid ram 50 consists of a cylinder 52 that is supported by a bracket 54 on drawbar 20 with a piston rod 56 extending from cylinder 52 and connected to arm 58 fixed to rockshaft 40. Thus, extension and retraction of fluid ram 50 will rotate rockshaft 40 and pivot wheels 46 about the axis for the rockshaft. The weight of the frame will thereby raise and lower the frame with respect to the ground.

Each outer end section or wing section 14 is identical in construction and only one will be described in detail. Wing section 14 consists of a plurality of transversely extending frame elements 60 that are interconnected at opposite ends by forward and aft frame elements 62. The transverse frame elements 60 again support a plurality of ground engaging members 34 and frame section 14 has a wing rockshaft 64 rotatably supported in bearings 66 supported on fore and aft frame element 62. The outer end of rockshaft 66 has an arm 68 extending therefrom with a wheel 70 rotatably supported on the outer end of the arm. Wing frame section 14 is pivoted about hinge axis defined by pins 18 through a fluid ram 71 that has opposite ends respectively connected to frame elements 26 and 60. While fluid rams 71 have been shown located on the rear frame elements 26, 60, for purposes of clarity of the drawings, these fluid rams are normally located on the front frame elements in a commercial structure.

According to the present invention, unique interconnecting means 74 are provided between opposite ends of main shaft 40 and adjacent ends of the respective wing shafts 64. The unique interconnection means 74 is most clearly illustrated in FIGS. 2 and 3. Interconnection means 74 consists of a first member 76 that is secured to the outer end of the main shaft 40. As illustrated in FIG. 3, the first member 76 is generally L-shaped in cross section and has a vertical leg 78 secured at its forward end to main shaft 40 with a horizontal leg 80 extending from the upper edge of vertical leg 78. As illustrated in FIG. 2, the upper horizontal leg 80 is generally in alignment with a peripheral edge of main shaft 40, as will be described later.

First arm 76 has a member 82 secured thereto adjacent the opposite end thereof. Member 82 is generally elongated in the fore and aft direction of the implement and has a downwardly directed convex, generally arcuate surface 84 defined thereon. The lowermost edge of arcuate surface 84 is generally in line with the hinge axis 18 between the main section 12 and wing section 14, as more clearly illustrated in FIG. 4. Also, arcuate member 40 has a generally flat extension 86 extending from one edge or the outer edge thereof and extension 86 is directed generally upwardly as illustrated in FIG. 2.

Interconnecting means 74 also includes a second arm 88 consisting of a vertical leg 90 having its forward end rigidly secured to the adjacent end of wing shaft 64 and having a generally horizontal leg 92 extending from a lower edge thereof, particularly adjacent the rear end of vertical leg 90. Horizontal leg 92 of arm 88 has a second member 94 secured thereto. Second member 94 has a generally flat upper surface 96 that extends parallel to horizontal leg 92 and a downwardly directed lip portion 98 on the outer edge of flat surface 96.

The elongated second member 94 is secured to horizontal leg 92 of arm 88 through a plurality of bolts 100 (only one being shown) and suitable adjustment means 102 may be interposed between member 94 and horizontal leg 92. In the illustrated embodiment, the adjustment means 102 consists of a plurality of shims interposed between arm 74 and member 94.

The operation of the unique interconnection means is believed to be understood from the above description and the accompanying drawings but will be briefly summarized at this point. When the wing sections are in a folded condition, the two respective sections extend generally perpendicular to the main frame section and arms 76 and 88 are in the position illustrated in FIG. 5.

Assuming now that the wing frames are moved to an unfolded or lowered condition wherein the wing frames are in end-to-end relation with the main center frame section, as illustrated in FIG. 1. During such downward pivotal movement, wheel 70 will first engage the ground to pivot the overlapping lip portion 98 towards and into engagement with flat portion 86 to insure that the two surfaces 84 and 96 are ultimately in engagement with each other when the frame sections are in the fully lowered position. In the fully lowered position, the weight of the outer end or wing section will tend to pivot arm 88 towards arm 76 and force the two adjacent surfaces into contact with each other.

One of the more significant aspects of the present invention is the fact that both arms 76 and 88 extend generally rearwardly from the respective shafts 40 and 64, as illustrated in FIG. 1. Furthermore, the arms are angularly related with respect to main shaft 40 and wing shaft 64 so that the arms extend generally horizontally, as illustrated in FIG. 2, when the implement is in the normal earthworking position wherein end portions 36 of ground engaging members 34 are located below the ground and perform the tilling operation. As shown in FIGS. 2 and 4, when the assembly or implement is in the normal earthworking position, the contact point between the two surfaces will produce extended surface contact and the extended surface contact is located along the hinge axis 18 between the frame sections 12 and 14. This means that any relative movement between the two arms, caused by uneven terrain, will produce very little or limited relative movement between the adjacent surfaces that are in contact with each other which minimizes the wear that results from such uneven terrain since the forces developed are due only to the weight of the machine rather than the combination of the weight of the machine and the soil reaction.

Another distinct advantage of the present invention is the fact that there is extended contact between the two adjacent surfaces along a point that extends generally fore and aft of the direction of travel of the vehicle. This point of contact is clearly illustrated in FIG. 2. An additional advantage with the arrangement as described above is the fact that the two arms, which extend generally fore and aft of the travel of direction of the vehicle are generally in alignment with the main frame elements of the respective frame sections when the implement or assembly is in a normal earthworking position. This means that there is little, if any, possibility of the interconnection being hit by an obstruction during normal operation.

When it is desired to condition the implement for road travel, the wing sections 14 are pivoted to a vertical position by actuation of fluid rams 71. It will be appreciated that prior to actuation of fluid rams 71, the frame sections will be raised above the earthworking position, illustrated in FIG. 2, to a transport position wherein arms 76 and 88 extend generally rearwardly and downwardly to locate members 82 and 94 below hinge axis 18. During initial pivotal movement of wing section 14 about hinge axis 18, outer wheel 70 will be raised above the ground so that the weight of the wheel will pivot wing shaft 64 to a position where arm 68 extends perpendicular to frame element 62. This will pivot arm 88 away from arm 76 to eliminate any interference between the arms during the pivotal movement of the wing section to the raised position. In the raised position, rockshaft 64 can be held in a suitable fixed position by securing means (not shown).

What is claimed is:

1. In a harrow assembly including a center main frame section and a pair of outer wing sections pivoted on the outer ends of said main frame section for articulated movement about hinge axes extending fore and aft of the path of travel of the assembly, a main shaft journaled for rotation on said main frame section about an axis extending transversely of a fore and aft path of travel of the assembly, a pair of wing shafts rotated on the respective wing sections and axially aligned with said main shaft when said sections are in end-to-end relation, means for rotating said main shaft on said main section, and connection means between said main shaft and said wing shafts for rotating said wing shafts with said main shaft, the improvement of each of said connection means including a first arm fixed to said main shaft and extending generally rearwardly with respect to said main shaft, said first arm having a downwardly directed convex, generally arcuate elongated surface defined thereon with a lowermost edge of said surface being vertically aligned with a fore and aft axis, and a second arm fixed to an adjacent end of a wing shaft and extending generally rearwardly with respect to said wing frame, said second arm having an elongated upwardly directed surface adapted to engage said arcuate surface along a line of contact between said surfaces defining extended surface contact which is generally aligned with said fore and aft axis when said assembly is in a normal earthworking position.

2. A harrow assembly as defined in claim 1, in which said first and second arms have a length several times greater than the diameters of said shafts and have their forward ends fixed to said shafts.

3. A harrow assembly as defined in claim 2, in which said surfaces are defined on elongated first and second members secured to said arms.

4. A harrow assembly as defined in claim 3, in which said lower edge of said arcuate surface and the axis of said main shaft are all located on a common flat plane.

5. A harrow assembly as defined in claim 4, further including adjustment means between said second member and said second arm for varying the spacing between said upwardly directed surface and said second member.

6. A harrow assembly as defined in claim 5, in which said adjustment means includes shims between said second member and said second arm.

7. In a harrow assembly including a center main frame section and a pair of outer wing sections pivoted on the outer ends of the said main frame section for articulated movement about hinge axes extending fore and aft of the path of travel of the assembly, a main shaft journaled for rotation on said main frame section about an axis extending transversely of a fore and aft path of travel of the assembly, a pair of wing shafts rotated on the respective wing sections and axially aligned with said main shaft when said sections are in end-to-end relation, means for rotating said main shaft on said main section, and connection means between said main shaft and said wing shafts for rotating said wing shafts with said main shaft, the improvement of each of said connection means including an elongated L-shaped first arm having a vertical leg fixed to said main shaft and a generally horizontal leg, said first arm extending generally rearwardly with respect to said main shaft, a first member on said horizontal leg having a downwardly directed convex, generally arcuate elongated surface defined thereon with a lowermost edge of said surface being vertically aligned with a fore and aft axis, and an elongated L-shaped second arm having a vertical leg fixed to an adjacent end of a wing shaft and a generally horizontal leg, said second arm extending generally rearwardly with respect to said wing frame, a second member on said horizontal leg of said second arm defining an upwardly directed elongated surface adapted to engage said arcuate elongated surface, said horizontal legs extending towards each other and being in overlapping relation to define extended surface contact between said surfaces with said extended surface contact being generally aligned with said fore and aft axis when said assembly is in a normal earthworking position.

8. In a harrow assembly including a center main frame section and a pair of outer wing sections pivoted on the outer ends of said main frame section for articulated movement about hinge axes extending fore and aft of the path of travel of the assembly, a main shaft journaled for rotation on said main frame section about an axis extending transversely of a fore and aft path of travel of the assembly, a pair of wing shafts rotated on the respective wing sections and axially aligned with said main shaft when said sections are in end-to-end relation, means for rotating said main shaft on said main section, and connection means between said main shaft and said wing shafts for rotating said wing shafts with said main shaft, the improvement of each of said connection means including a first arm having a forward end fixed to said main shaft and extending generally rearwardly with respect to said main shaft, said first arm having a length several times greater than the diameter of said main shaft, said first arm having an elongated first member secured thereto with a downwardly directed convex, generally arcuate surface defined thereon with a lowermost edge of said surface being vertically aligned with a fore and aft axis, and a second arm having a forward end fixed to an adjacent end of a wing shaft and extending generally rearwardly with respect to said wing frame, said second arm having a length several times greater than the diameter of said wing shaft, said second arm having a second elongated member defining an upwardly directed flat surface adapted to engage said arcuate surface to define extended surface contact between said surfaces with said extended surface contact being generally aligned with said fore and aft axis when said assembly is in a normal earthworking position, said first member having a flat extension on one edge of said arcuate surface and said second member having a downwardly directed lip adapted to engage said flat extension to guide said flat surface into engagement with said arcuate surface when said sections are pivoted to end-to-end relation.

* * * * *